L. H. DARAPSKY.
APPARATUS FOR FREEING WATER FROM ITS CONTAINED IRON IN A CONTINUOUS CIRCUIT.
APPLICATION FILED JUNE 9, 1909.
973,263.  Patented Oct. 18, 1910.
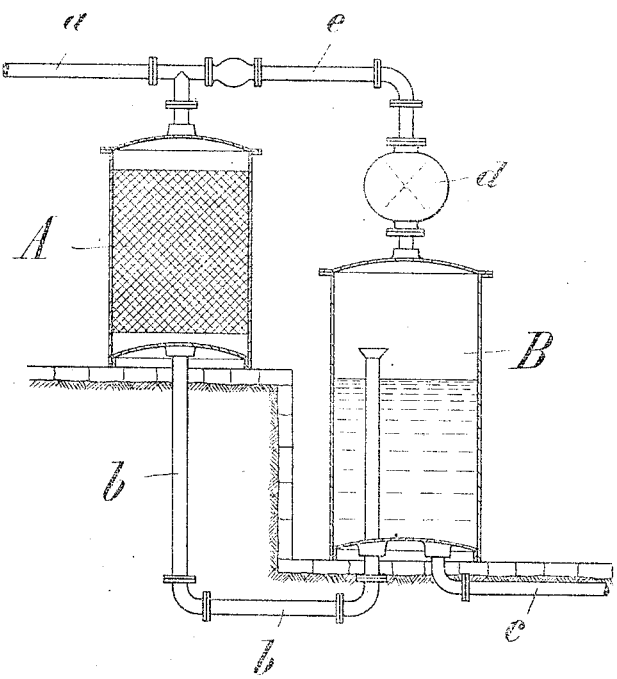
Witnesses.
Jesse N. Lutton.
Inventor.
Ludwig Heinrich Darapsky
by
Atty.

UNITED STATES PATENT OFFICE.

LUDWIG HEINRICH DARAPSKY, OF HAMBURG, GERMANY, ASSIGNOR TO THE FIRM OF DESENISS & JACOBI AKTIENGESELLSCHAFT, OF HAMBURG, GERMANY.

APPARATUS FOR FREEING WATER FROM ITS CONTAINED IRON IN A CONTINUOUS CIRCUIT.

973,263.  Specification of Letters Patent.  Patented Oct. 18, 1910.

Application filed June 9, 1909. Serial No. 501,182.

*To all whom it may concern:*

Be it known that I, LUDWIG HEINRICH DARAPSKY, a subject of the German Emperor, and resident of Hamburg, Germany, have invented certain new and useful Improvements in Apparatus for Freeing Water from its Contained Iron in a Continuous Circuit, of which the following is a specification.

This invention relates to apparatus for freeing water from the iron it contains.

In carrying out the process of freeing water from the iron it contains, by passing the water with an excess of air in a continuous circuit through a filter in which the ocher formed by the oxidation of the dissolved iron is precipitated, it has been observed that in most cases the introduction of a large amount of air has a favorable effect upon the efficiency of the process. It is therefore advisable not to limit unduly the amount of the air.

The introduction of the air under pressure requires however an expenditure of power that is proportional to the amount of the air thus forced into the circuit.

Now the present invention has for its object to provide an improved apparatus by the use of which this expenditure of power is avoided. In the improved apparatus instead of allowing the air to escape from the filter into the atmosphere the water with the air is passed into an air separator in which the air that is in a state of mechanical admixture with the water is separated from the latter. From this separator the separated air is returned by an air pump back into the filter. This continuous circuit of a determined amount of air is based on the fact that only a small portion of this air is lost, that is to say, is consumed in the oxidation of the iron salts dissolved in the form of suboxid salts in the water. This small loss of air which is due to the combination between the oxygen and the iron, or to the greater solubility of oxygen compared with that of nitrogen must be made up either continuously by means of a small air pump, or by connecting the water circulating pump with the atmosphere. This is the more necessary because the purified water carries away with it an appreciable quantity of air in the form of small bubbles. The decrease of the contents of the continuous circuit is indicated by the variation of the water level. By far the greater quantity of the air remains however permanently in circulation within the continuous circuit.

One form of apparatus embodying the present improvements is illustrated in vertical section in the accompanying diagrammatic drawing in which:—

A is the filter and B is the air separator. The water which it is desired to free from the iron it contains, is forced by a water pump through the pipe *a* into the filter where it meets the air forced in through the pipe *e*. The mixture of water and air passes through the pipe *b* into the air separator B whence the water freed from air and iron is delivered through the pipe *c* continuously to the place of consumption.

The delivery of purified water is always under the pressure of the water pump. The air separated from the purified water is sucked up by the air pump *d* and forced back into the filter. If desired the water pump may be placed at the outlet or delivery end of the entire apparatus instead of at the entrance or inlet end, in other words the apparatus may be included in the suction pipe of the water pump, without departing from the nature of the present invention.

Apart from the decrease of volume due to absorption of the oxygen by the iron and as above referred to, the air pump interposed between the water and air separator and the filter has only to overcome the difference of pressure between the upper and lower ends of the filter, and the power consumed by the pump is independent therefore of the water pressure. This difference amounts to only two or three meters of water column, while the total pressure in the filter may amount to several atmospheres, according to the height at which the purified water is delivered. This modified arrangement has special advantages in some cases.

I claim:

1. In an apparatus for purifying water, a closed filter, a closed separator for air and water separate from the filter and into which the filter discharges, means to pump air from the separator to the filter and means to supply water to the filter with the air.

2. In an apparatus for removing iron from water, a closed filter, a closed separator for air and water at a lower level than the filter and into which the filter discharges, means to supply water to the filter and a pump to deliver the separated air from the separator to the filter simultaneously with the water supplied to said filter.

3. In an apparatus for purifying water, a closed filter, a closed separator for air and water into which the filter discharges, means to supply water under pressure to the filter and a pump to pump the air from the separator to the filter simultaneously with the water under pressure.

4. The combination with a service water main, of a closed filter into which said main discharges, a closed separator into which the filter discharges, a pump to pump the air separated from the filtered water in the separator to the inlet of the filter, and a continuation of the service water main extending from the separator.

LUDWIG HEINRICH DARAPSKY.

Witnesses:
MAX A. G. LEMCKE,
ERNEST H. L. MUMMENHOFF.